March 12, 1963 H. C. GEER Re. 25,350

MULTI-HANGER BRACKET FOR CONDUIT SUPPORT

Original Filed Jan. 6, 1960

INVENTOR
HAROLD C. GEER

BY Price and Heneveld

ATTORNEYS

United States Patent Office

Re. 25,350
Reissued Mar. 12, 1963

25,350

MULTI-HANGER BRACKET FOR CONDUIT SUPPORT

Harold C. Geer, 1453 Arcadia Drive, Grand Rapids, Mich.

Original No. 3,022,030, dated Feb. 20, 1962, Ser. No. 756, Jan. 6, 1960. Application for reissue Apr. 26, 1962, Ser. No. 193,044
4 Claims. (Cl. 248—58)

Matter enclosed in heavy brackets [ ] appears in the original patent but forms no part of this reissue specification; matter printed in italics indicates the additions made by reissue.

This invention relates to a hanger bracket, and more particularly to a bracket for supporting conduits.

*This application is a reissue application of United States Letters Patent 3,022,030 issued February 20, 1962, entitled Multi-Hanger Bracket for Conduit Support.*

In constructing a dwelling, it is necessary that conduits such as water pipes, electrical conduits and others be installed to provide the house with various utilities. In providing the dwelling with such conduits it is desirable that they be hidden; therefore, they usually appear beneath the floor and run both parallel and transversely to the joists forming part of the superstructure. In installing such conduits it is necessary to support them from the joists or some other structure. They are usually supported from joists since that is the structure usually most readily available for support.

Many types of fasteners such as staples, clamps, wire, and other things are used to support conduits. Many of these fasteners are undesirable for obvious reasons, one of these reasons being that in using staples and clamps the conduits must lie directly adjacent the joints so that they may be secured thereto. This is not always desirable, since the proper position for the pipe may be to place them centrally between the joists. Also, when using such means of fastening it is often difficult to secure the conduits to the joints since it is necessary for the workman to work in a small cramped area. Oftentimes, conduits installed by this method are not neat appearing, since the staples will split the joists and leave splinters which are both unpleasant to look at and dangerous.

Often, conduits provide a means of distribution of services within the building where the mechanical attachment is a source of undesirable noises such as vibration as set up by motors, or noises induced by conduit expansion-contraction caused by the changing temperatures of contained fluids being transferred, as encountered in domestic hot water supplying plumbing fixtures and the varying temperatures in supplying radiation for hot water heating.

Common conduit fasteners attach the conduit in a rigid manner to the structure, usually the joists, where vibration or expansion-contraction noises are transmitted to the structure causing considerable disturbance to the occupants.

Applicant has overcome many of these problems by the hanger bracket disclosed herein. This bracket can be installed on a joist so as to support conduits running parallel to the joists or transversely thereto. The bracket can be positioned between the joists to support conduits at several positions therebetween due to the spacing of the hangers, and can be adjusted so as to suspend the conduits below the bottom edge of the joists or well within the confines of the area between the joists. Further, the hanger bracket herein disclosed, provides a means of non-rigid support to "dampen" both vibration and expansion-contraction noise by virture of the "floating" suspension of the conduit away from all actual parts of the structure. A bracket is secured directly to the joist or joists by fasteners and provides a neat-appearing means of suspending conduits. Since the installation of the bracket is very simple, it steps up the production time of suspending conduits.

It is an object of this invention to provide a multi-hanger bracket for conduits which is of simple construction and therefore economical to manufacture.

Another object of this invention is to provide a multi-hanger bracket for conduits which is simple to install, thereby simplifying the operation of installing conduits.

Still another object of this invention is to provide a hanger bracket for supporting conduits which has multiple hangers providing for the spacing of conduits or several conduits at different intervals between joists.

A further object of this invention is to provide a hanger bracket for supporting conduits which is adaptable for supporting conduits running parallel with the joists and transversely to the joists.

These and other objects and advantages in the practice of this invention will become more apparent in the illustration and description of a working embodiment of the invention, as herein set forth. In the drawings.

Figure 3:
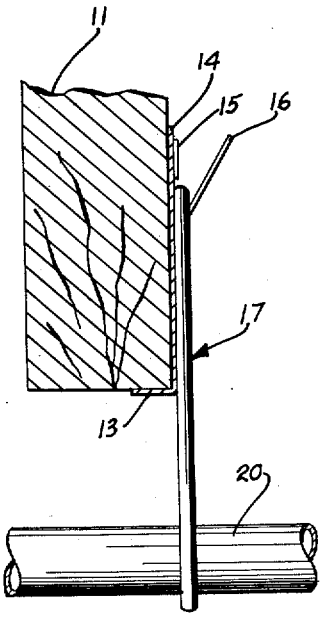
FIG. 3 is a cross-sectional view taken along the plane III—III of FIG. 1.
Figure 4:
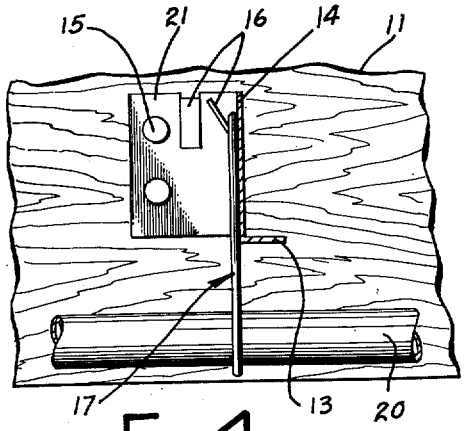
FIG. 4 is a cross-sectional view taken along the plane IV—IV of FIG. 2.

This invention pertains to a bracket for supporting conduits. The bracket is formed from an elongated L-shaped member or rigid plate which has hangers or bendable strips punched from the top edge thereof. The hangers are bent outwardly and support a hook or hooks which are suspended therefrom. The bracket is provided with apertures which allow fasteners to pass therethrough and secure the bracket to the joists or supporting structure. Several hangers are punched out of the bracket at equally spaced intervals along the length thereof to provide several means of support at different points. The opposite ends of the bracket are designed to be folded so as to appear normal to a face of the bracket. These folded portions or tabs provide a means of suspending the bracket between joists. The flange which forms the short end of the L not only strengthens the bracket against bending strain, but also acts as an alignment and positioning means when the bracket is used lengthwise of the joists as shown in FIG. 3.

Figure 1:
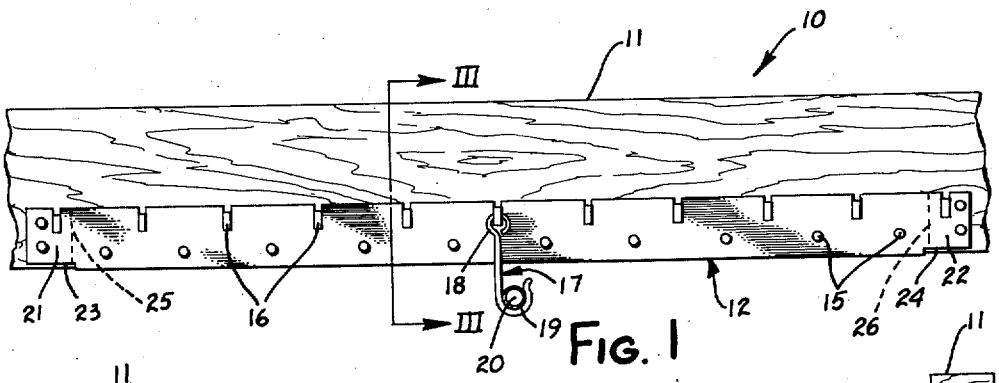
FIG. 1 is a side, elevational view of the multi-hanger bracket installed for the support of conduits disposed transversely thereto.

Referring now specifically to FIG. 1 of the drawings, the multi-hanger bracket assembly is designated generally as 10. The assembly includes a joist or joists, the bracket 12 and its hangers 16, and supporting hooks 17 which are suspended therefrom which in turn support conduits such as 20.

Figure 2:
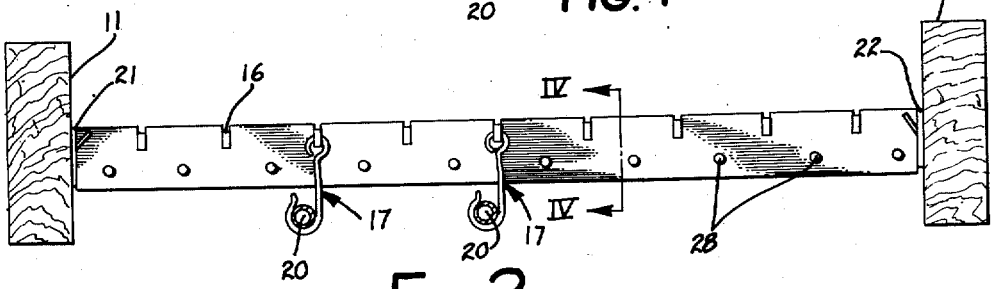
FIG. 2 is a side, elevational view of the multi-hanger bracket installed between joists in a manner for supporting conduits running parallel to the joists.

The bracket 12 is a generally L-shaped member in cross section having a short leg 13 and a long leg 14 disposed normal thereto. The bracket 12 is an elongated member of a length somewhat greater than the distance between that of parallel disposed joists as shown in FIG. 2. Since the distance between joists varies anywhere up to sixteen inch centers, the brackets 12 are manufactured in various lengths to accommodate the various dimensions. However, when the bracket 12 is used for supporting conduits which run transversely across the joists, any of the brackets may be used.

The upper edge of the long leg 14 is punched at equal intervals throughout the length thereof. The punching operation does not completely sever the punching from the bracket, but leaves projections or hangers 16 extending from the side edge thereof. These projections or load supporting means may be shaped to accommodate hooks to be described more fully hereinafter.

The ends of the bracket 12 have a portion of the short leg 13 removed at either end to form recesses 23 and 24. The ends of the bracket 12 can then be folded so as to appear normal to the face of long leg 14, providing supporting tabs 21 and 22. With the tabs 21 and 22 in this position the bracket can be placed between joists in a manner similar to that shown in FIG. 2 and be used for supporting conduits which run parallel to the joists 11.

The bracket 12 is provided with apertures 28 at equally spaced intervals and in the tab areas 21 and 22. Fasteners 15 extend through the apertures 28 and secure the bracket 12 to the supporting structure. The fasteners may be nails, screws or any conventional type of fastener.

Hooks 17 having eyes 18 and conduit loops 19 support the conduit members 20. The hangers 16 project or are threaded through the eyes 18 and the hooks 17 are suspended therefrom. The conduits 20 are supported within the conduit loops 19 of the hooks 17.

ASSEMBLY

To assemble the hanger bracket for supporting conduits running transversely with respect to the joists, the bracket is applied to a joist as shown in FIG. 1. The bracket is positioned on the joist so that the long leg 14 abuts a side of the joist and the short leg 13 abuts the bottom edge of the joist as shown in FIG. 3. Fasteners 15 are positioned in apertures 28 and secured to the joist at various intervals. The eye 18 is threaded upon the desired hanger 16 and allowed to assume its suspended or hanging position. The conduit is then placed within the conduit loop 19. A separate hanger 17 is used for each conduit suspended.

To assemble the bracket to support conduits running parallel to the joists the procedure is as follows. The ends of the brackets 12 are folded along fold lines such as 25 and 26 to form the support tabs 21 and 22 respectively. The bracket 12 is then positioned between the joists and moved to the proper height on the side of the joists. Fasteners 15 are then passed through the apertures 28 formed in the tab areas and secured to the parallel disposed joists. The eye 18 is then threaded through the appropriate hanger 16 and the hook 17 allowed to hang. The conduit or conduits 20 can then be inserted in the conduit loop or loops 19 depending on the number of conduits being suspended.

It can be seen that applicant has disclosed a hanger bracket which is quickly adaptable to supporting conduits running either transversely or parallel to the joists. The bracket is of simple design and can be manufactured and sold at a price which is highly competitive. The bracket is easy to install and therefore can be installed quickly, reducing the time necessary for installation. The bracket is pleasing in appearance, and due to the multiple spacing of the hangers throughout the length thereof, provides a means of adjusting the conduits without removing the bracket. Thus, adjustment can be made by simply placing the hook or hooks on different hangers.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A multi-hanger bracket for supporting conduits comprising: an elongated generally L-shaped bracket including a short leg and a long leg disposed normally thereto and integral therewith, portions of said short leg being removed at the ends of said bracket to allow the ends of said long leg to be folded normally thereto forming tabs; [the top edge] *portions* of said long leg having spaced deformed strips comprising hangers formed therein, said long leg and tabs having apertures adapted to receive means for securing said bracket to supporting structures and a plurality of [hook-type] *conduit-receiving loop shaped* elements removably suspended from selected ones of said strip, said elements including [hook] *loop* portions capable of receiving and supporting conduits.

2. A multi-hanger bracket for supporting conduits comprising: an elongated generally L-shaped bracket including a short leg and a long leg disposed normally thereto and integral therewith and adapted to abut the side and bottom edge of a support structure thereby enabling its attachment along a joist when desired, portions of said short leg being removed at the ends of said bracket to allow the ends of said long leg to be folded normally thereto forming tabs thereby enabling its attachment between joists when desired; [the top edge] *portions* of said long leg being formed at spaced intervals into hangers adapted to receive [hooks] *conduit-receiving loop shaped members* for suspending conduits therefrom; said long leg and said tab having apertures adapted to receive fasteners for attaching said bracket to said supporting structure in either manner of attachment.

3. A multi-hanger bracket for supporting conduits comprising: an elongated generally L-shaped bracket including a short leg and a long leg disposed normally thereto and integral therewith, portions of said short leg being removed at the ends of said bracket to allow the ends of said long leg to be folded normally thereto forming tabs; [the top edge] *portions* of said long leg being severed and deformed at spaced intervals into hanger strips adapted to removably receive [hooks] *conduit-receiving loop shaped members* for suspending conduits therefrom; said tabs having apertures adapted to receive fasteners for securing said bracket between supporting structures.

4. A multi-hanger bracket for supporting conduits comprising: an elongated L-shaped bracket including a first leg and a second leg disposed normally thereto and integral therewith, portions of at least one of said legs being removed at the ends of said bracket to allow the ends of said second leg to be folded normally thereto forming tabs; [the top edge] *portions* of said second leg being severed and deformed at spaced intervals into hanger strips adapted to removably receive [hooks] *conduit-receiving loop shaped members* for suspending conduits therefrom; said tabs having apertures adapted to receive fasteners for securing said bracket between supporting structures.

References Cited in the file of this patent or the original patent

UNITED STATES PATENTS

| | | |
|---|---|---|
| 177,936 | Haines | May 30, 1876 |
| 919,896 | Lemke | Apr. 27, 1909 |
| 1,288,024 | Kendig | Dec. 17, 1918 |
| 1,611,397 | Wells | Dec. 21, 1926 |
| 2,628,799 | Aaby | Feb. 17, 1953 |
| 2,816,726 | White | Dec. 17, 1957 |
| 2,964,279 | Galloway | Dec. 13, 1960 |